United States Patent
Groben et al.

(10) Patent No.: US 12,304,284 B2
(45) Date of Patent: May 20, 2025

(54) AIR VENT FOR A VEHICLE

(71) Applicant: ILLINOIS TOOL WORKS INC., Glenview, IL (US)

(72) Inventors: Manfred Groben, Gau-Bickelheim (DE); Günther Krämer, Enkenbach-Alsenborn (DE)

(73) Assignee: ILLINOIS TOOL WORKS INC., Glenview, IL (US)

( * ) Notice: Subject to any disclaimer, the term of this patent is extended or adjusted under 35 U.S.C. 154(b) by 375 days.

(21) Appl. No.: 17/680,449

(22) Filed: Feb. 25, 2022

(65) Prior Publication Data

US 2022/0274464 A1  Sep. 1, 2022

(30) Foreign Application Priority Data

Mar. 1, 2021 (DE) ...................... 10 2021 104 838.9

(51) Int. Cl.
*B60H 1/34* (2006.01)
*F24F 13/14* (2006.01)

(52) U.S. Cl.
CPC ........... *B60H 1/3421* (2013.01); *F24F 13/14* (2013.01); *B60H 2001/3464* (2013.01)

(58) Field of Classification Search
CPC .......... B60H 1/3421; B60H 2001/3464; F24F 13/14
USPC ....................................................... 454/155
See application file for complete search history.

(56) References Cited

U.S. PATENT DOCUMENTS

| | | | |
|---|---|---|---|
| 9,989,275 B2 * | 6/2018 | Oe ........................ | B60H 1/3421 |
| 10,414,246 B2 * | 9/2019 | Shibata ................ | B60H 1/3421 |
| 11,305,616 B2 | 4/2022 | Poolman | |
| 11,618,303 B2 * | 4/2023 | Wieczorek ........... | B60H 1/3414 |
| | | | 454/155 |
| 11,707,970 B2 * | 7/2023 | Heth .................. | B60H 1/00514 |
| | | | 454/155 |
| 2016/0009163 A1 * | 1/2016 | Terai .................... | B60H 1/3421 |
| | | | 454/155 |
| 2016/0250909 A1 | 9/2016 | Schneider | |
| 2021/0031594 A1 | 2/2021 | Schaal | |
| 2021/0206238 A1 * | 7/2021 | Munoz ................ | B60H 1/3421 |

(Continued)

FOREIGN PATENT DOCUMENTS

| | | |
|---|---|---|
| DE | 102005054292 A1 | 5/2007 |
| DE | 102014101315 A1 | 4/2015 |
| DE | 202015102026 U1 | 6/2015 |

(Continued)

*Primary Examiner* — Avinash A Savani
*Assistant Examiner* — Dana K Tighe
(74) *Attorney, Agent, or Firm* — THOMPSON HINE LLP

(57) ABSTRACT

An air vent (1) for a motor vehicle, wherein the air vent (1) includes a housing (2) having an air inlet region (3) and an opposite air outlet region (4). In the housing (2) of the air vent (1), an airflow splitter (5), which extends at least regionally or partially transversely to the housing longitudinal direction, is arranged such that a first air guiding region (6) and a second air guiding region (7) are formed, wherein, for the purpose of air deflection as needed in a first direction, in particular in a vertical direction, the air vent (1) includes a device for airflow control, via which device a portion of the total airflow flowing through the housing (2), the portion flowing through the first and/or second air guiding region (6, 7), is adjustable.

21 Claims, 8 Drawing Sheets

(56) References Cited

U.S. PATENT DOCUMENTS

2021/0260968 A1* 8/2021 Kim .................... B60H 1/3414
2022/0009315 A1* 1/2022 Baumann ............. B60H 1/3421

FOREIGN PATENT DOCUMENTS

| DE | 202013012285 U1 | 1/2016 |
| DE | 102017111011 A1 | 7/2017 |
| DE | 102016107700 A1 | 10/2017 |
| DE | 102016121937 A1 | 5/2018 |
| DE | 102019107446 A1 | 9/2020 |
| DE | 102019120516 A1 | 2/2021 |
| DE | 102021103235 A1 | 3/2022 |
| JP | S62228833 A | 10/1987 |

* cited by examiner

AIR VENT FOR A VEHICLE

TECHNICAL FIELD

The present invention relates to air vents, in particular for ventilation systems of motor vehicles. Furthermore, the invention relates to ventilation systems having such air vents as well as corresponding air vent systems.

BACKGROUND

In ventilation apparatuses for vehicles, air vents or air vent nozzles are typically used, which enable the exiting airflow to be controlled in a targeted manner. Such air vents are used in order to supply fresh air, in particular, into a vehicle interior.

The airflow flows through an inlet opening at an air inlet region of the air vent into the air duct, which is delimited by the housing wall of the air vent, through said air duct, and ultimately through an outlet opening at the air outlet region of the air vent into the interior of a motor vehicle (for example, a car or truck). The airflow generally follows a main flow direction, which can run in particular at least substantially parallel to a longitudinal axis of the housing of the air vent.

In known air vents, the airflow is deflected from the main flow direction by one or more air guiding elements, for example pivotable air guiding blades. In addition to the air guiding elements, the housing of the air vent that delimits the air duct can also serve to deflect the air from the main flow direction.

For example, air vents are known whose housing walls run arcuately in the direction of one another at least at the air inlet region, wherein an airflow directed by an air guiding element in the direction of the arcuate housing wall follows the arc shape and thus undergoes a corresponding deflection.

Such air vents are known, for example, from DE 20 2015 102 026 U1 and DE 10 2017 111 011 A1.

In addition, reference is made to DE 20 2013 012 285 U1. In the air vent known from this prior art, two mutually opposite housing walls of the air vent housing are designed in an arcuate fashion. An air guiding element having a first air guiding surface and a second air guiding surface opposite the first air guiding surface is arranged in the air vent housing, wherein a first air duct is formed by the housing and the first air guiding surface, and a second air duct is formed by the housing and the second air guiding surface. The first air duct is configured in order to transport a first volumetric flow of air that can be passed into the housing through the air inlet opening to the air outlet opening, while the second air duct is configured in order to transport a second volumetric flow of air that can be passed into the housing through the air inlet opening to the air outlet opening.

Furthermore, in the air vent known from DE 20 2013 012 285 U1, a wing element is arranged in the housing, wherein the wing element is movably arranged in an air inlet section between the air inlet opening and the end of the air guiding element facing said opening. The movability of the wing element is configured such that the direction of the air exiting the air outlet opening is adjusted due to the position of the wing element.

However, due to the arcuate design of the housing wall, such air vents are quite complex to manufacture, in particular by way of a plastic injection molding method.

The air vent known from DE 20 2013 012 285 U1 also has certain disadvantages, in particular with respect to the overall achievable throughput of the amount of air to be introduced into the interior of the motor vehicle.

In particular, the functionality of the air vent known from DE 20 2013 012 285 U1 is based on the fact that the air deflection is achieved by varying the volumetric flows (first and second volumetric flow) through the two air ducts that are formed using the air guiding element. By adjusting or varying the ratio of the volumetric flows flowing through the first and second air ducts of the known air vent, a desired air deflection of the air flowing out of the air outlet region of the air vent is substantially performed.

However, it has been shown that such a mechanism for causing air deflection reduces the performance of the air vent, i.e. the volumetric flow that can be emitted by the air vent per unit of time and/or the "quality" of the airflow that can be emitted by the air vent, in particular with regard to airflow fanning and direction. Above all, with the approach known from DE 20 2013 012 285 U1, for example, an evenly distributed volumetric flow at the air outlet region of the air vent cannot be achieved for different positions of the air vent.

Apart from these disadvantages, the air vent known from DE 20 2013 012 285 U1, in particular, has conceptual disadvantages in terms of air deflection.

For example, even in the straight alignment of the air guiding elements, the known air vents often divert or deflect the air repeatedly within the housing of the air vent, which results in an increased flow resistance. The effect of the air guiding elements received in the housing of the air vent is thereby significantly impaired, in particular for horizontal air deflection.

In addition, due to the increased flow resistance upstream of the outlet opening of the air vent, the exiting airflow is widened, which is also generally not desired.

A further disadvantage of known air vents is that the air guiding elements arranged in the air duct, such as air guiding blades, limit the flow region that is available for the air. This is true in particular in the region of the end positions of the air guiding elements. Limitations of the available flow region of greater than 50% can occur.

In addition, for design reasons, there is a desire on the part of some to integrate the outlet openings of the air vents harmoniously into the overall 1-panel design as slit-like openings in such a way that the functional elements of the air vents, in particular the blades, are not directly discernible from the vehicle interior.

Because air vents are directly visible in the interior of the motor vehicle, they are also intended to have an optically appealing appearance. In particular, there is a need to adapt the design and appearance of the air vents to the interior atmosphere. To this end, air vents are known that have a relatively low height compared to their length. An air deflection is therefore limited.

In order to achieve a defined air deflection, the air vents known from the prior art generally have a height such that a certain number of air guiding blades can be arranged. The number of air guiding blades thus also defines the maximum air deflection.

There is an increasing need for air vents having a relatively low height with a comparatively wider width. The air deflection via so-called vertical blades is not affected, because there is sufficient space for a variety of blades due to the large width of the blades.

However, there are problems with air deflection accomplished via the air guiding blades that extend across the width of the air vent. In such air vents, only a small width of the air guiding blades, usually a maximum of three air guiding blades, can often be arranged. The maximum air deflection is thus limited.

For construction-related reasons, air vents having an even lower height can only comprise one air guiding blade extending across the width of the air vent. However, there is then insufficient air deflection, in particular in the vertical direction, i.e. up and down.

SUMMARY

Based on the situation described above, the underlying problem of the present invention is to provide an air vent for a motor vehicle, with which air vent an optimized air deflection is ensured, wherein the overall performance of the air vent is improved despite a relatively simple construction. In particular, this is intended to be achievable with a slit or line vent.

The invention is based in particular on the problem of providing an air vent for a motor vehicle that allows as much design freedom as possible with a maximized flow region for air.

This problem is solved in particular by an air vent according to the independent claim 1.

Accordingly, the invention relates in particular to an air vent for a motor vehicle, wherein the air vent comprises a housing having an air inlet region and an opposite air outlet region.

An airflow splitter, which extends at least regionally or partially transverse to the longitudinal housing direction, is arranged in the housing of the air vent device such that a first air guiding region and a second air guiding region are formed.

For the purpose of air deflection as needed in a first direction, in particular in a vertical direction, the air vent controller further comprises an airflow control device. Via the device for airflow control, a portion of the total airflow flowing through the housing, said portion flowing through the first and/or second air guiding region, can be adjusted.

The air vent according to the invention is used in particular in a motor vehicle, such as a car or truck. Via the air inlet opening of the housing, the air vent is supplied with fresh air that passes through the housing to the air outlet opening and into the vehicle interior via said air outlet region. The outlet opening is delimited by a housing outlet wall. It can be formed, in particular, by an aperture of the housing. The corresponding portions of the total airflow flowing through the housing, said portions flowing through the first and/or second air guiding region, are accordingly adjustable by means of the device for airflow control arranged in the housing of the air vent. In this way, the airflow directed into the vehicle interior is deflectable in a desired manner.

Various solutions are considered for the formation of the first and second air guiding regions.

According to implementations of the air vent according to the invention, it is provided that the airflow splitter comprises an impact body that is fixed relative to the housing of the air vent filter. The impact body is preferably arranged here—when viewed in the main flow direction of the air vent—upstream of the air outlet region. The impact body has a certain longitudinal extension when viewed in the longitudinal direction of the housing, such that the first air guiding region is formed between, for example, an upper housing wall region and the impact body and the second air guiding region between, for example, a lower housing wall region and the impact body.

As already stated, a corresponding aperture or such a device can be associated with the air outlet region of the air vent housing. The aperture or such an apparatus serves to at least regionally or partially delimit the cross-section of the air outlet opening of the air vent.

In addition to the device for airflow control, the aperture also has an airflow-deflecting function, because the aperture in the air outlet region that at least regionally or partially delimits the cross-section of the air outlet opening of the air vent forms a first outflow edge associated with the airflow portion flowing through the first air guiding region and a second outflow edge associated with the airflow portion flowing through the second air guiding region.

In this context, it is particularly preferably provided that the airflow splitter, and in particular the impact body of the airflow splitter and/or the aperture, which delimits the cross-section of the air outlet opening of the air vent at least regionally or partially, is/are configured such that, in a plan view of the air outlet opening of the air vent, in particular only the impact body of the airflow splitter and in particular only one end face of the impact body facing in the direction of the air outlet opening is visible. As already stated, the impact body of the airflow splitter is configured to be fixed relative to the housing.

Thus, in the last mentioned preferred embodiment of the air vent, it is ensured that a motor vehicle occupant cannot see any components of the air vent that are movable relative to the housing of the air vent. A particularly aesthetic design of the air vent is thus possible.

In addition, it is ensured that no foreign body can penetrate the interior of the air vent via the air outlet opening of the air vent, for example a pen or the like, which can then cause a collision with the movable components of the air vent and possibly damage thereof.

Alternatively or in addition to the aforementioned further development, according to implementations of the air vent according to the invention, it is provided that the aperture, which delimits the cross-section of the air outlet opening of the air vent at least regionally or partially, is configured such that, in a plan view of the air outlet opening of the air vent, it covers, and preferably just covers, the first and second air guiding region. In other words, an orthogonal projection of the first outflow edge of the aperture or the second outflow edge of the aperture no longer passes through the first or second air guiding region in this embodiment, but preferably appears at an upper or lower end region of the front face of the impact body.

According to implementations of the airflow vent according to the invention, the airflow control device comprises corresponding elements that are pivotable or retractable as needed into the first and/or second air guiding region. In particular, it is provided in this context that the elements for airflow control are preferably configured as air flaps that are movable relative to the housing and the airflow splitter.

For example, the device for airflow control can comprise a first air flap associated with the first air guiding region and a second air flap associated with the second air guiding region, wherein the first and second air flap are each supported pivotably relative to the housing and the airflow splitter about an axis of rotation running perpendicular to the first direction.

In particular, the first and second air flap are pivotally connected to the housing of the air vent via the upstream end region of the respective air flap (directly or indirectly). This pivotable connection is configured, in particular, such that the axes of rotation about which the first and second air flap are supported pivotably relative to the housing and relative to the air splitter each run through the upstream end region of the respective air flap.

In order to ensure that, in a neutral position of the air flaps, they do not or at least only minimally affect the airflow flowing through the housing of the air vent, it is provided according to a further development of the air vent according to the invention that the housing comprises a first bulge associated with the first air flap, in which bulge the first air flap is at least regionally received or receivable when the first air flap is in its neutral position and is not pivoted relative to the housing and the air splitter.

Alternatively or additionally, it is provided that the housing comprises a second bulge associated with the second air flap, in which bulge the second air flap is at least regionally received or receivable when the second air flap is in its neutral position and is not pivoted relative to the housing and the airflow splitter.

A particularly easy-to-realize but nonetheless effective airflow control is possible [in that] an upstream end region of the first and second air flap is respectively present upstream of an upstream end region of the airflow splitter and a downstream end region of the first and second air flap is respectively present downstream of a downstream end region of the airflow splitter.

Preferably, the first and second air flap of the airflow control device are configured identically but in minor-symmetry to one another. In this context, in particular, it is provided that the first and second air flap each have a straight surface facing in the direction of the respective air guiding region. However, a slightly curved surface, in particular a concave or convex curved surface, is advantageous in order to be able to completely seal the corresponding air guiding region in an end position of the corresponding air flap, for example.

According to implementations of the air vent according to the invention, it is provided that the first and second air flap are configured and in particular motion-coupled to one another in such a way that, for the purpose of air deflection as needed in the first, in particular vertical, direction, one of the two air flaps is pivoted at least regionally into the correspondingly assigned air guiding region while the other of the two air flaps remains in its neutral position.

In particular, according to further developments of the last mentioned embodiment, it is provided that the first and second air flap are configured and in particular motion-coupled to one another in such a way that, for airflow control, both air flaps are pivotable into the correspondingly associated air guiding region.

For the purpose of air deflection as needed in a second direction perpendicular to the first direction, in particular in a horizontal direction, the air vent according to the invention comprises at least one air guiding blade, which is pivotable about a second axis of rotation running perpendicular to the first axis of rotation.

According to a further (second) aspect of the present invention, the underlying problem of the invention is solved, in particular, by the subject matter of the parallel claim 14.

This is thus in particular an air vent for a motor vehicle, wherein the air vent comprises a housing, which, like in the first aspect of the invention described above, has an air inlet region and an opposite air outlet region.

In the second aspect of the present invention, for the purpose of air deflection as needed in a first direction, in particular in a vertical direction, the air vent comprises two air guiding elements, which are at least regionally mutually opposed to one another and are pivotable relative to the housing about a common axis of rotation perpendicular to the first direction, between which elements an air guiding region is formed. In this context, in particular, it is provided that the two air guiding elements are pivotable in a uniform manner, in particular together and preferably relative to one another.

In this aspect of the invention, when viewed in the main flow direction of the air vent, two first air guiding blades are provided upstream of the two air guiding elements and are at least regionally mutually opposed to one another and pivotable relative to the housing about an axis of rotation perpendicular to the first direction.

The first air guiding blades are configured in order to direct the airflow coming from the air inlet region of the housing in the direction of an entry region of the air guiding region formed between the two air guiding elements.

According to further developments of the aforementioned air vent, in order to ensure that the housing of the air vent can be formed as flat as possible, it is provided that the air guiding elements each have a surface that faces in the direction of the air guiding region and is at least substantially straight.

In this context, for example, it is conceivable that the air guiding elements are formed by wall regions of a hollow, cylindrical baffle body, wherein the hollow, cylindrical baffle body is pivotable relative to the housing about an axis of rotation perpendicular to the first direction.

The hollow, cylindrical baffle body preferably comprises an at least substantially rectangular cross-sectional surface.

A particularly efficient and optimal air deflection can be achieved in this context when the hollow, cylindrical baffle body has a length that is approximately equal to the distance between the air guiding elements or greater than the distance between the air guiding elements.

According to implementations of the two first air guiding blades, it is provided that the two first air guiding blades are configured in particular as grinding blades associated with the air guiding elements. Preferably, the two first air guiding blades form a confusor region, in which the airflow coming from the air inlet region of the housing is accelerated in the direction of the entry region of the air guiding region formed between the two air guiding elements. A particularly efficient airflow deflection can thus be accomplished.

The two first air guiding blades are preferably motion-coupled to the air guiding elements in such a way that, upon a pivoting of the air guiding elements about the common axis of rotation, the first air guiding blades are pivoted in an opposite direction.

In this context, in particular, it is possible that the two first air guiding blades are pivotable relative to the housing about a common axis of rotation perpendicular to the first direction.

For the purpose of air deflection as needed in a second direction perpendicular to the first direction, in particular in a horizontal direction, the air vent preferably comprises at least one second air guiding blade, which is pivotable about a second axis of rotation running perpendicular to the first axis of rotation. The at least one second air guiding blade is preferably received at least regionally between the two first air guiding blades.

In a further development of the last mentioned embodiment, it is provided that the at least one second air guiding blade is received at least regionally between the two first air guiding blades in such a way that, upon a pivoting of the two first air guiding blades relative to the housing of the air vent, the at least one second air guiding blade is likewise pivoted.

For the purpose of air deflection as needed in the second direction, the air vent preferably comprises a plurality of second air guiding blades. These second air guiding blades can be motion-coupled to one another via a coupling rod mechanism. The second air guiding blades are preferably arranged at least substantially parallel to one another in each position. The second air guiding blades are in particular supported pivotally relative to the housing and relative to the two first air guiding blades between a first end position and a second end position. In at least one of the two end positions, the second air guiding blades block the air guiding region between the first air guiding blades, preferably completely.

Accordingly, the third aspect of the present invention relates in particular to an air vent for a vehicle, which, like the air vent according to the first and second aspect of the present invention, comprises a housing having an air inlet region and an opposite air outlet region.

In the third aspect of the present invention, in a downstream region of the housing, when viewed in the main flow direction of the air vent, two mutually at least regionally opposed air guiding shells are provided/arranged such that between a first air guiding shell of the two air guiding shells and an inner wall region of the housing a first air guiding region is formed, between the two air guiding shells a second air guiding region is formed, and between a second air guiding shell of the two air guiding shells a third air guiding region is formed. In particular, it is provided that the two air guiding shells are configured as air guiding shells that are fixed relative to the housing.

For the purpose of air deflection as needed in a first direction, in particular in a vertical direction, the air vent device according to the third aspect of the present invention comprises an air deflection device arranged upstream of the two air guiding shells when viewed in the main flow direction of the air vent. Via the air deflection device, the airflow coming from the air inlet region of the housing is optionally directed through the first, second, and third air guiding region or only through the first and second air guiding region or only through the second and third air guiding region.

In particular, the device for air deflection is further configured in order to adjust a portion of the total airflow flowing through the housing of the air vent, said portion flowing through the first and/or second and/or third air guiding region, preferably arbitrarily.

The air guiding shells each have a concave curved surface facing in the direction of the second air guiding region. Alternatively, however, it is also conceivable that a respective surface of the air guiding shells facing in the direction of the second air guiding region can be adapted.

Alternatively, the air guiding shells can each also be configured as cylindrical shell-shaped, curved air guiding elements.

Advantageously, according to the third aspect of the present invention, the air vent comprises an aperture that at least regionally or partially delimits the effective flow cross-section of the first and third air guiding region. The aperture can be designed, for example, in the form of a wall region of the housing that projects regionally or partially into the first and third air guiding region.

This aperture, which at least regionally or partially delimits the effective flow cross-section of the first and third air guiding region, forms a first deflection/outflow edge associated with the airflow portion flowing through the first air guiding region and a second deflection/outflow edge associated with the airflow portion flowing through the third air guiding region.

These deflection/outflow edges make a positive contribution to the selective air deflection.

According to implementations of the air vent device according to the third aspect of the present invention, the device for air deflection comprises two first air guiding blades, which are at least regionally opposite to one another and pivotable relative to the housing about an axis of rotation perpendicular to the first direction, said blades preferably being configured as grinding blades.

In this context, in particular, it is provided that the two first air guiding blades are motion-coupled such that, in a neutral position of the air vent, the airflow coming from the air inlet region of the housing is not or at least substantially not deflected by the two first air guiding blades, and that, for the purpose of air deflection in the first direction, the first air guiding blade of the two first air guiding blades, which lies further in the first direction, is retracted further into the air guiding region between the two first air guiding blades, and the other air guiding blade of the two first air guiding blades is extended further out of the air guiding region between the two first air guiding blades such that the portion of the total airflow flowing through the housing, said portion flowing through the air guiding region lying further in the first direction, is reduced.

For the purpose of air deflection as needed in a second, in particular horizontal, direction perpendicular to the first direction, the air vent can comprise at least one second air guiding blade, which is pivotable about a second axis of rotation that extends perpendicular to the first axis of rotation. The at least one second air guiding blade is preferably received at least regionally in the air guiding region between the two first air guiding blades.

In this context, in particular, it is conceivable that, for the purpose of air deflection as needed in the second direction, the air vent comprises a plurality of air guiding blades, which, for example, are motion-coupled to one another via a coupling rod mechanism. Preferably, in each position, the second air guiding blades are arranged at least substantially parallel to one another.

The second air guiding blades are in particular supported pivotally relative to the housing and relative to the two first air guiding blades between a first end position and a second end position, wherein, in at least one of the two end positions, the second air guiding blades preferably completely block the air guiding region between the two first air guiding blades.

The invention further relates to a ventilation system for a motor vehicle, having an air vent according to the first, second, or third aspect of the invention.

Furthermore, the invention relates to an air vent system for a motor vehicle, wherein the air vent system comprises at least one air vent of the type described above.

BRIEF DESCRIPTION OF THE DRAWINGS

Exemplary embodiments of the air vent according to the invention are described in further detail below, with reference to the accompanying drawings.

The following are shown.

DETAILED DESCRIPTION

Figure 1:
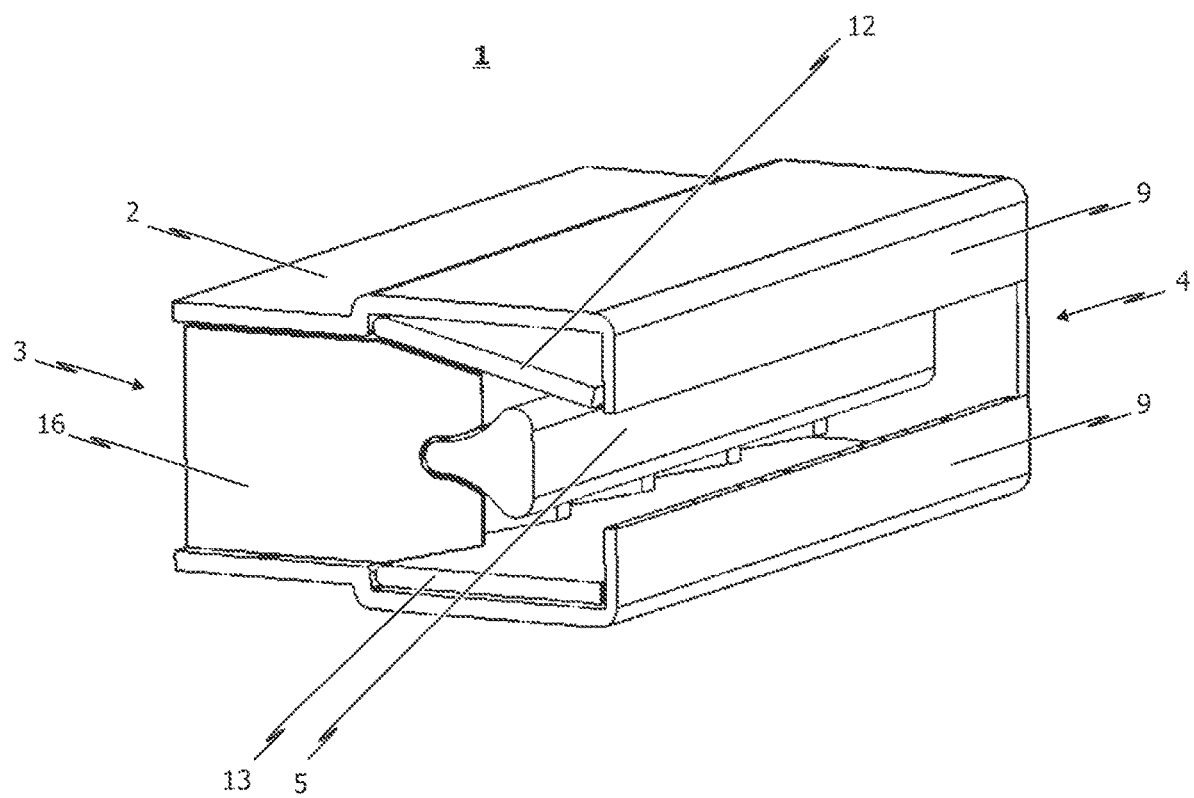
FIG. 1 schematically and in a partially cut isometric view, an exemplary embodiment of the air vent according to the first aspect of the invention, wherein the air vent is in a position in which an air deflection occurs upwardly.

A first exemplary embodiment of the air vent 1 according to the first aspect of the present invention is described in further detail below with reference to the drawings in FIG. 1 to FIG. 5.

The air vent 1 comprises a housing 2 having an air inlet region 3 and an opposite air outlet region 4. An airflow splitter 5, which extends at least regionally or partially transverse to the longitudinal housing direction, is arranged in the housing 2 of the air vent 1 device such that a first air guiding region 6 and a second air guiding region 7 are formed.

For the purpose of air deflection as needed in a first direction, in particular in a vertical direction, the air vent 1 comprises a device for airflow control, via which device a portion of the total airflow flowing through the housing 2, said portion flowing through the first and/or second air guiding region, is adjustable.

In particular, the airflow splitter 5 comprises a baffle body that is fixed relative to the housing 2, which baffle body, when viewed in the main flow direction 8 of the air vent 1, is arranged upstream of the air outlet region 4.

In addition, in the exemplary embodiment of the air vent 1 according to the invention according to the first aspect of the invention, it is conceivable that the air outlet region 4 comprises an aperture 9 that at least regionally or partially delimits the cross-section of the air outlet opening of the air vent 1. In the air outlet region 4, the aperture 9 forms a first outflow edge 10 associated with the airflow portion flowing through the first air guiding region 6 and a second outflow edge 11 associated with the airflow portion flowing through the second guiding region 7.

Figure 5:
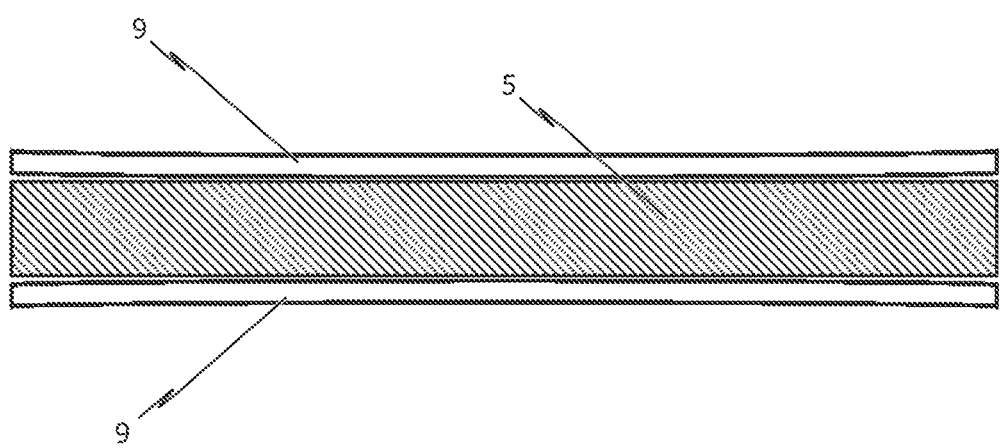
FIG. 5 schematically and in a plan view, a cutout of the air outlet region of the exemplary embodiment of the air vent according to the invention according to FIG. 1.

As can be discerned from the drawing in FIG. 5, in particular, the airflow splitter 5, and in particular the impact body of the airflow splitter 5 and the aperture 9 at least regionally or partially delimiting the cross-section of the air outlet opening of the air vent 1 are configured such that, in a plan view of the air outlet opening of the air vent 1, in particular only the impact body of the airflow splitter 5 and in particular only one end face of the impact body facing in the direction of the air outlet opening is visible.

Figure 4:
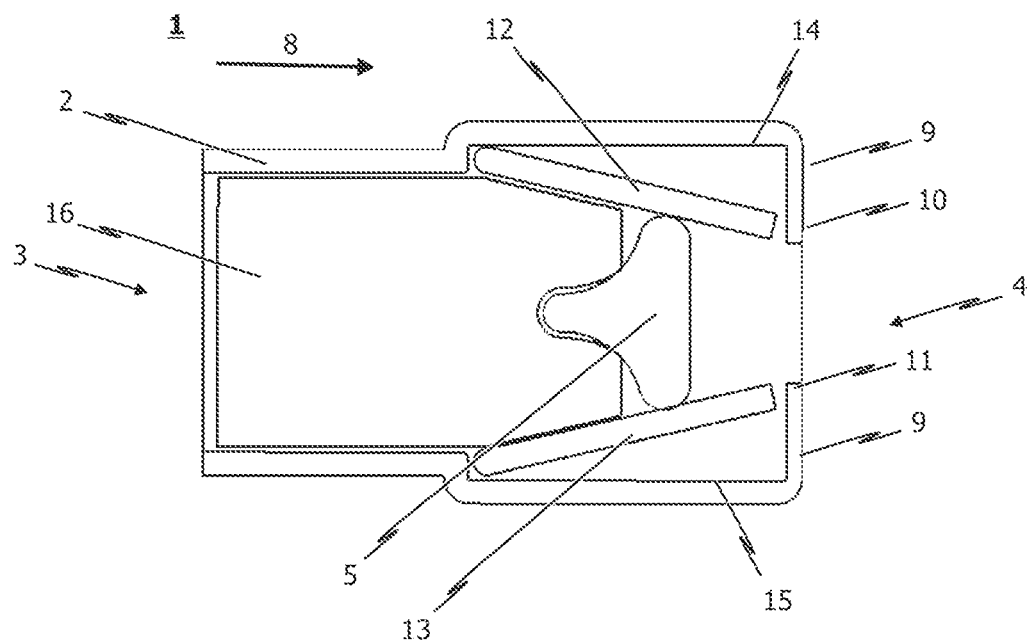
FIG. 4 schematically and in a cut view, the exemplary embodiment of the air vent according to the invention according to FIG. 1, but in a position in which an airflow through the housing of the air vent is blocked.

Further, as can be discerned from the cut view in FIG. 4, the aperture 9, which delimits the cross-section of the air outlet opening of the air vent 1 at least regionally or partially, is configured such that, in a plan view of the air outlet opening of the air vent 1, it covers, and preferably just covers, the first and second air guiding region 6, 7.

In the exemplary embodiment of the air vent 1 according to the first aspect of the invention, the airflow control device comprises elements 12, 13 that are retractable as needed into the first and/or second air guiding regions 6, 7. The elements 12, 13 for airflow control are preferably configured as air flaps that are movable relative to the housing 2 and the airflow splitter 5.

In detail, the device for airflow control comprises a first air flap 12 or ramp associated with the first air guiding region 6 and a second air flap 13 or ramp associated with the second air guiding region 7, wherein the first and second air flap/ramp 12, 13 are each supported pivotably relative to the housing 2 and the airflow splitter 5 about an axis of rotation running perpendicular to the first direction.

Figure 2:
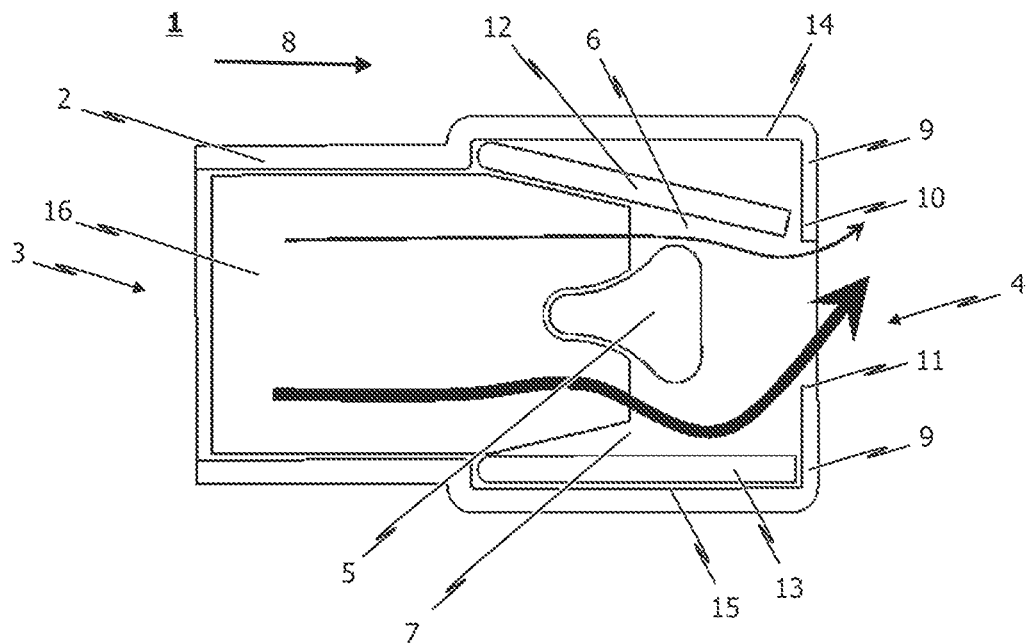
FIG. 2 schematically and in a cut view, the exemplary embodiment of the air vent according to FIG. 1.
Figure 3:
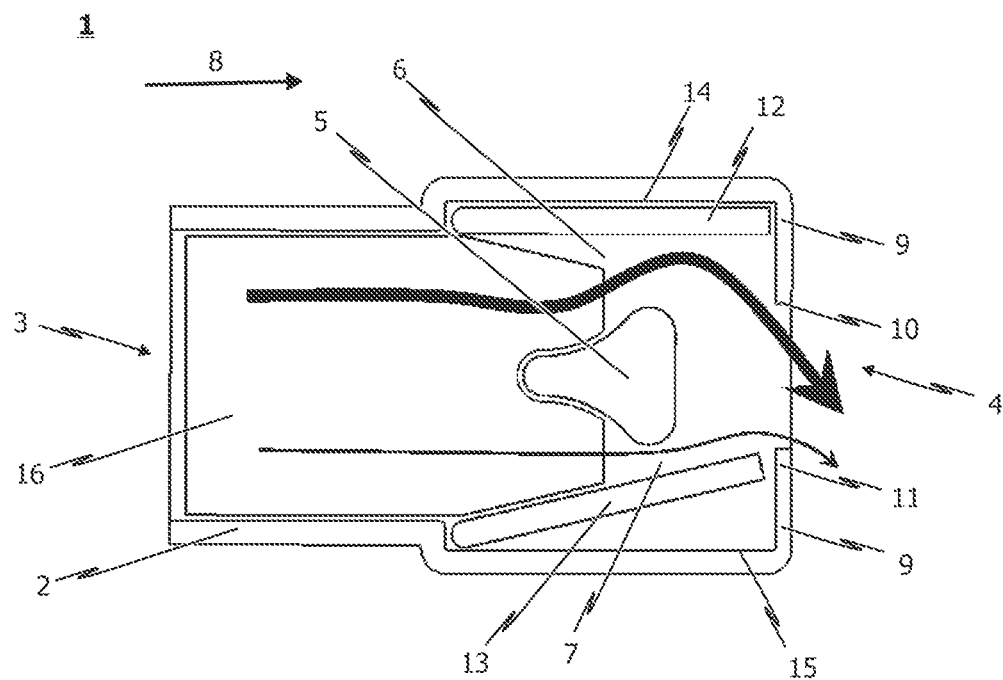
FIG. 3 schematically and in a cut view, the exemplary embodiment of the air vent according to the invention according to FIG. 1, but in a position in which an air deflection occurs downwardly.

As can be discerned in particular from the cut views in FIG. 2, FIG. 3, and FIG. 4, the first and second air flap 12, 13 are pivotally connected to the housing 2 of the air vent 1 via the upstream end region of the respective air flap 12, 13. In particular, it is provided that the axes of rotation about which the first and second air flap 12, 13 are supported pivotably relative to the housing 2 and the air splitter 5 each run through the upstream end region of the respective air flap 12, 13.

It can further be discerned from the cut views that the housing 2 comprises a first bulge 14 associated with the first air flap 12, in which bulge the first air flap 12 is at least regionally received or receivable when the first air flap 12 is in its neutral position and is not pivoted relative to the housing 2 and the airflow splitter 5 (cf. in particular FIG. 2).

Similarly, the housing 2 comprises a second bulge 15 associated with the second air flap 13, in which bulge the second air flap 13 is at least regionally received or receivable when the second air flap 13 is in its neutral position, shown for example in FIG. 3, and is thus not pivoted relative to the housing 2 and the airflow splitter 5.

When viewed in the main flow direction 8 of the air vent 1, an upstream end region of the first and second air flap 12, 13 lies respectively upstream of an upstream end region of the airflow splitter 5, and a downstream end region of the first and second air flap 12, 13 lies respectively downstream of a downstream end region of the airflow splitter 5.

In the exemplary embodiment of the air vent 1 according to the first aspect of the invention as shown in the drawings, it is provided that the first and second air flap 12, 13 are configured identically but in mirror-symmetry to one another. The first and second air flap 12, 13 each have a straight surface facing in the direction of the respective air guiding region 6, 7.

The first and second air flap 12, 13 are configured and in particular motion-coupled to one another in such a way that, for the purpose of air deflection as needed in the first, in particular vertical, direction, one of the two air flaps 12, 13 is pivoted at least regionally into the correspondingly assigned air guiding region 6, 7 while the other of the two air flaps 13, 12 remains in its neutral position (cf. FIG. 2 and FIG. 3).

On the other hand, the first and second air flap 12, 13 are preferably likewise configured and in particular motion-coupled to one another in such a way that, for airflow control, both air flaps 12, 13 are pivotable into the correspondingly associated air guiding region 6, 7 (cf. FIG. 4).

For the purpose of air deflection as needed in a second direction perpendicular to the first direction, in particular in a horizontal direction, the air vent 1 according to the first aspect of the present invention comprises at least one air guiding blade 16, which is pivotable about a second axis of rotation running perpendicular to the first axis of rotation.

The exemplary embodiment of the air vent 1 according to the first aspect of the invention is characterized in particular in that all kinematic elements of the air vent 1, and in particular the air flaps 12, 13 and the at least one air guiding blade 16, lie in a region within the housing 2 of the air vent 1 that is not visible from the outside via the air inlet region 3.

The air deflection is carried out via the two air flaps 12, 13, which lie movably in the downstream region of the housing 2 of the air vent 1. The airflow splitter 5, and in particular the impact body of the airflow splitter 5, is preferably located in the middle region of the air vent 1 and deflects the airflow against the outflow edges 10, 11 formed by the aperture 9. The first and second air flap 12, 13 control the airflow by more or less deflecting the airflow against the respective outflow edge 10, 11.

The airflow splitter 5, and in particular the impact body of the airflow splitter 5, divides the airflow flowing through the housing 2 into two sub-airflows. If, for example, the air is to be deflected upwards, the upper air flap 12 is extended out of the housing 2. This reduces the upper air guiding region 6 between the impact body and the upper air flap 12. By reducing the effective flow cross-section, the volumetric flow of the upper airflow is also reduced, as a result of which the lower volumetric flow increases. This is deflected upwards at the outflow edge 11 and also takes the upper volumetric flow with it due to its pulse.

The deflection can thus be controlled upwardly via the adjustment of the upper air flap 12.

A lateral deflection of the airflow takes place via the aforementioned at least one air guiding blade 16, which can also be provided downstream of the impact body.

In the position of the first and second air flap 12, 13 as shown in FIG. 4, the air flaps 12, 13 seal against the impact body. For a reliable seal and corresponding tolerance compensation, the first and second air flap 12, 13 can be designed to be slightly curved. In this case, the first and second air flap 12, 13 are deflected on their two outer sides. The first and second air flap 12, 13 first meet the impact body in their middle and successively close outwardly.

A first exemplary embodiment of the air vent 1 according to the second aspect of the invention is described in further detail below with reference to the drawings in FIG. 6 to FIG. 9.

Like the air vent 1 according to the first aspect of the invention, the air vent 1 according to the second aspect of the invention comprises a housing 2 having an air inlet region 3 and an opposite air outlet region 4.

For the purpose of air deflection as needed in a first direction, in particular in a vertical direction, the air vent 1 according to the second aspect of the invention comprises two air guiding elements 31, which are at least regionally mutually opposed to one another and are pivotable relative to the housing 2 about a common axis of rotation perpendicular to the first direction, between which elements an air guiding region 32 is formed.

In particular, it is provided that the two air guiding elements 31 are pivotable in a uniform manner, in particular together and preferably relative to one another.

When viewed in the main flow direction 8 of the air vent 1, two first air guiding blades 33 are provided upstream of the two air guiding elements 31 and are at least regionally mutually opposed to one another and pivotable relative to the housing 2 about an axis of rotation perpendicular to the first direction. These two first air guiding blades 33 are configured in order to direct the airflow coming from the air inlet region 3 of the housing 2 in the direction of an entry region of the air guiding region 32 formed between the two air guiding elements 31.

In this context, in particular, it is provided that the two first air guiding blades 33 are pivotable relative to the housing 2 about a common axis of rotation perpendicular to the first direction.

In particular, the air guiding elements 31 of the exemplary embodiment of the air vent 1 according to the second aspect of the invention each have an at least substantially straight surface facing in the direction of the air guiding region 32.

Figure 6:
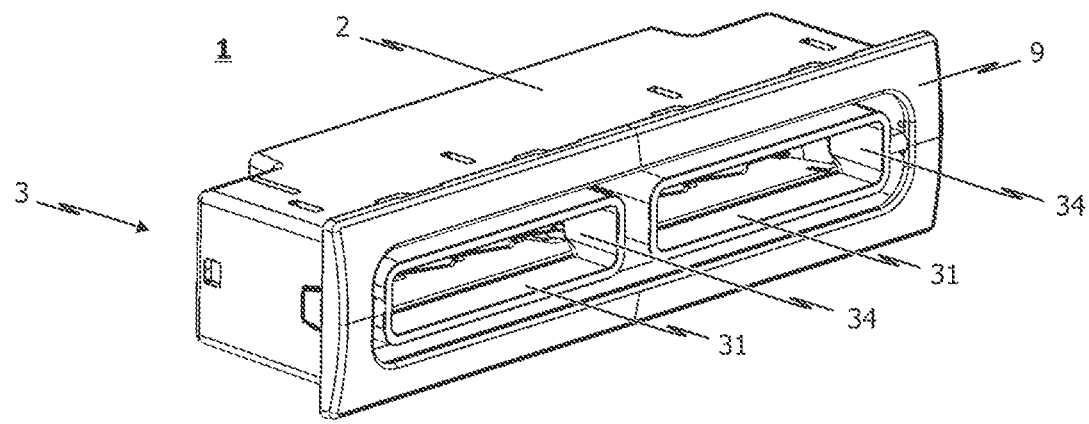
FIG. 6 schematically and in an isometric view, an exemplary embodiment of the air vent according to the second aspect of the present invention, namely in a neutral position of the air vent.

As can be seen, for example, from the isometric view in FIG. 6, it is conceivable in this context that the air guiding elements 31 are formed by wall regions of a hollow, cylindrical baffle body 34 (barrel), which is pivotable relative to the housing 2 about an axis of rotation perpendicular to the first direction.

In particular, the hollow, cylindrical baffle body 34 can comprise an at least substantially rectangular cross-sectional surface. In this context, it is provided in particular, for example, that the hollow, cylindrical baffle body 34 has a length that is approximately equal to the distance between the air guiding elements 31 or is greater than the distance between the air guiding elements 31.

The two first air guiding blades 33 are configured in particular as grinding blades associated with the air guiding elements 31. In particular, the two first air guiding blades 33 form a confusor region, in which the airflow coming from the air inlet region 3 of the housing 2 is accelerated in the direction of the entry region of the air guiding region 32 formed between the two air guiding elements 31.

In particular, the two first air guiding blades 33 are motion-coupled to the air guiding elements 31 in such a way that, upon a pivoting of the air guiding elements 31 about the common axis of rotation, the first air guiding blades 33 are pivoted in an opposite direction. In this regard, we refer in particular to the illustrations in FIG. 8 and FIG. 9.

For the purpose of air deflection as needed in a second direction perpendicular to the first direction, the air vent 1 according to the second aspect of the invention comprises at least one second air guiding blade 35, which is pivotable about a second axis of rotation running perpendicular to the first axis of rotation, wherein the at least one second air guiding blade 35 is preferably received at least regionally between the two first air guiding blades 33.

In particular, the at least one second air guiding blade 35 is received at least regionally between the two first air guiding blades 33 in such a way that, upon a pivoting of the two first air guiding blades 33 relative to the housing 2, the at least one second air guiding blade 35 is likewise pivoted.

Figure 7:
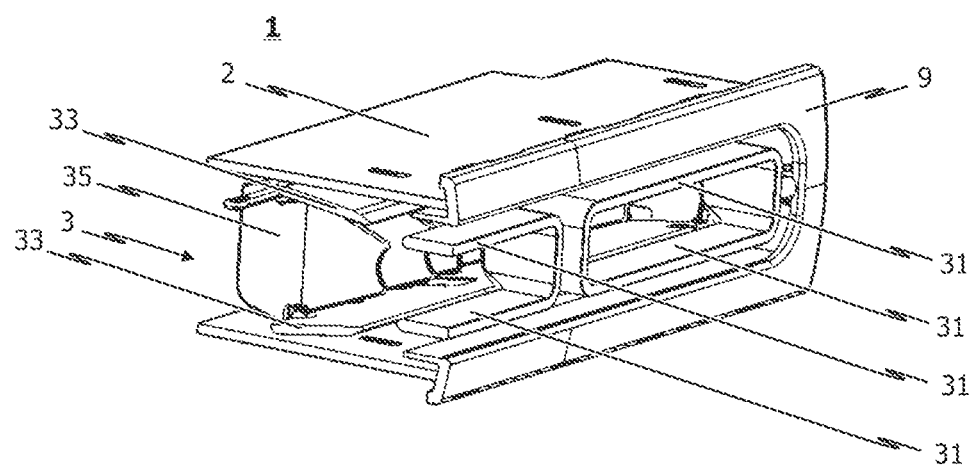
FIG. 7 schematically and in an isometric cut view, the exemplary embodiment of the air vent according to the invention according to FIG. 6.
Figure 8:
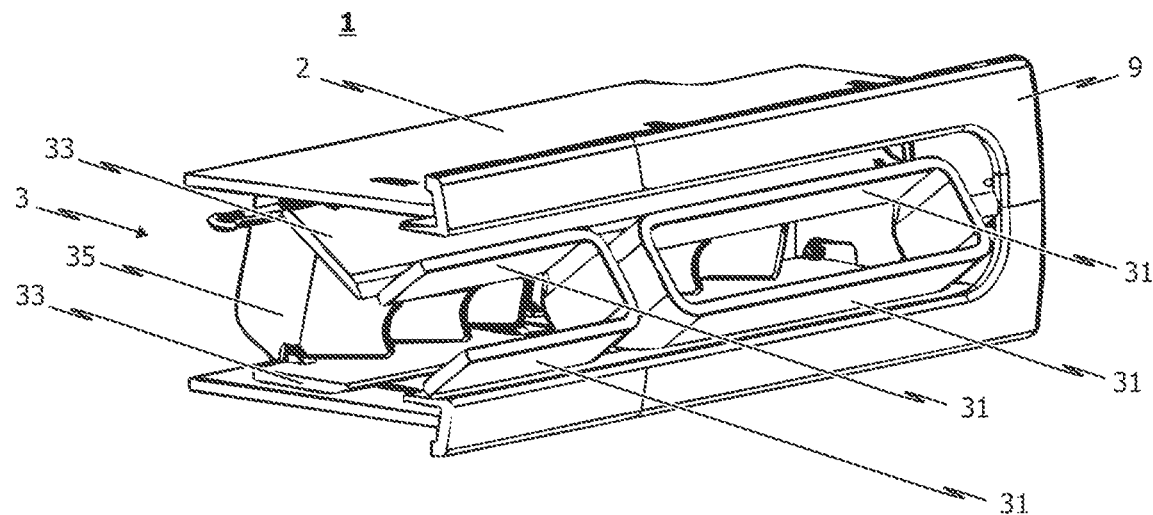
FIG. 8 schematically and in an isometric cut view, the exemplary embodiment of the air vent according to the invention according to FIG. 7, but in a position in which an air deflection occurs upwardly.
Figure 9:
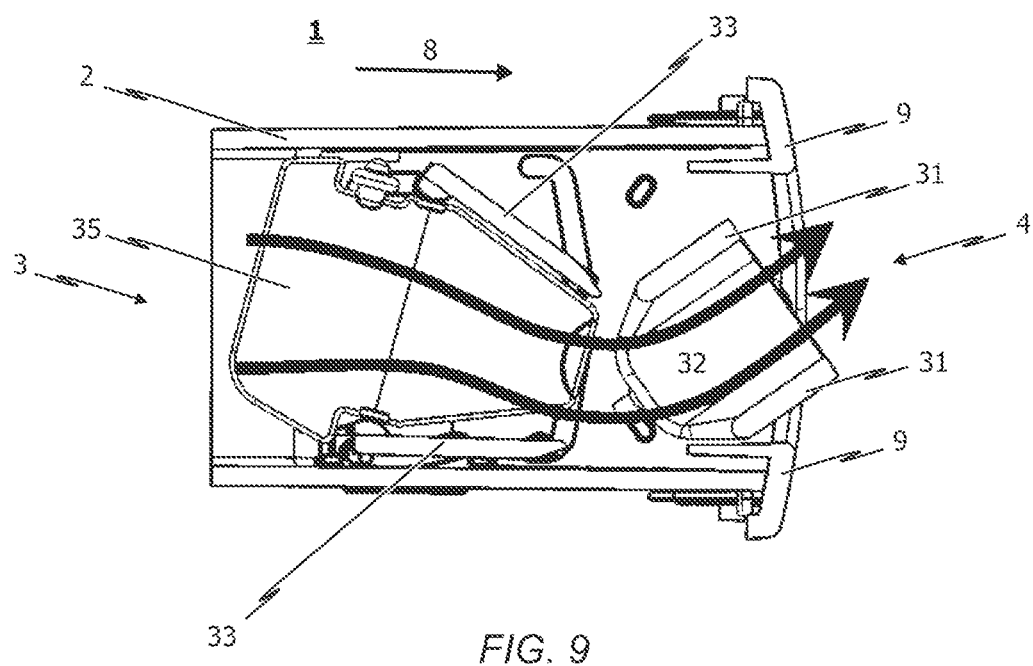
FIG. 9 schematically and in a cut view, the exemplary embodiment of the air vent according to the invention according to FIG. 8.
Figure 10:
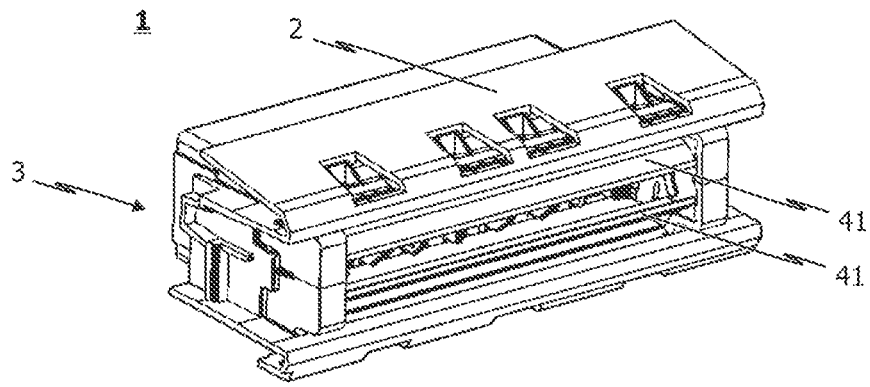
FIG. 10 schematically and in an isometric view, an exemplary embodiment of the air vent according to the third aspect of the invention, namely in a neutral position of the air vent.
Figure 11:
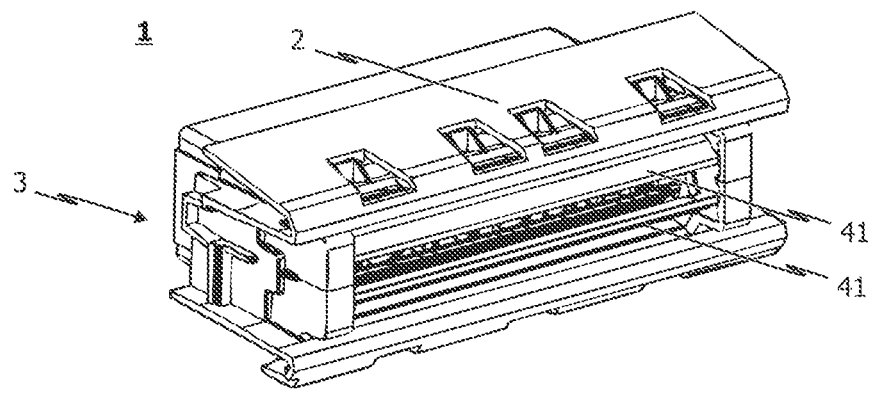
FIG. 11 schematically and in an isometric view, the exemplary embodiment of the air vent according to the invention according to FIG. 10, namely in a position in which an air deflection occurs downwardly.
Figure 12:
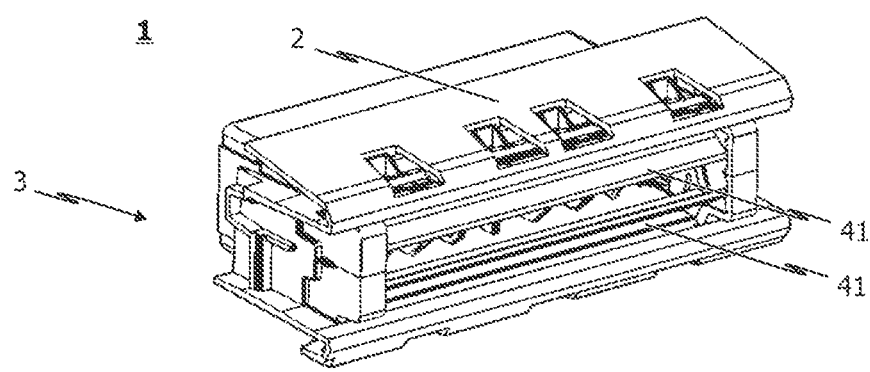
FIG. 12 schematically and in an isometric view, the exemplary embodiment of the air vent according to the invention according to FIG. 10, namely in a position in which an air deflection occurs upwardly.
Figure 13:
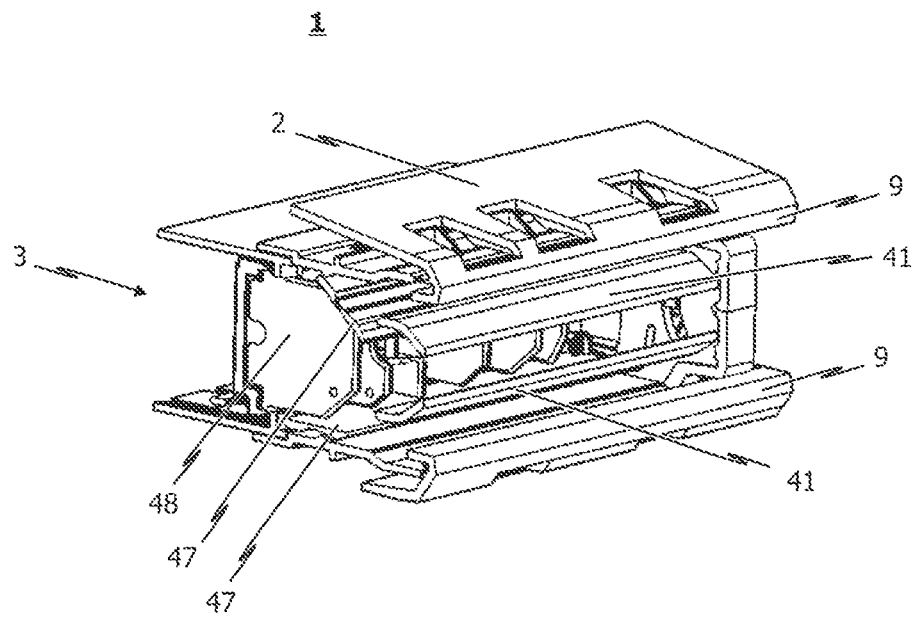
FIG. 13 schematically and in an isometric cut view, the exemplary embodiment of the air vent according to the invention according to FIG. 12.
Figure 14:
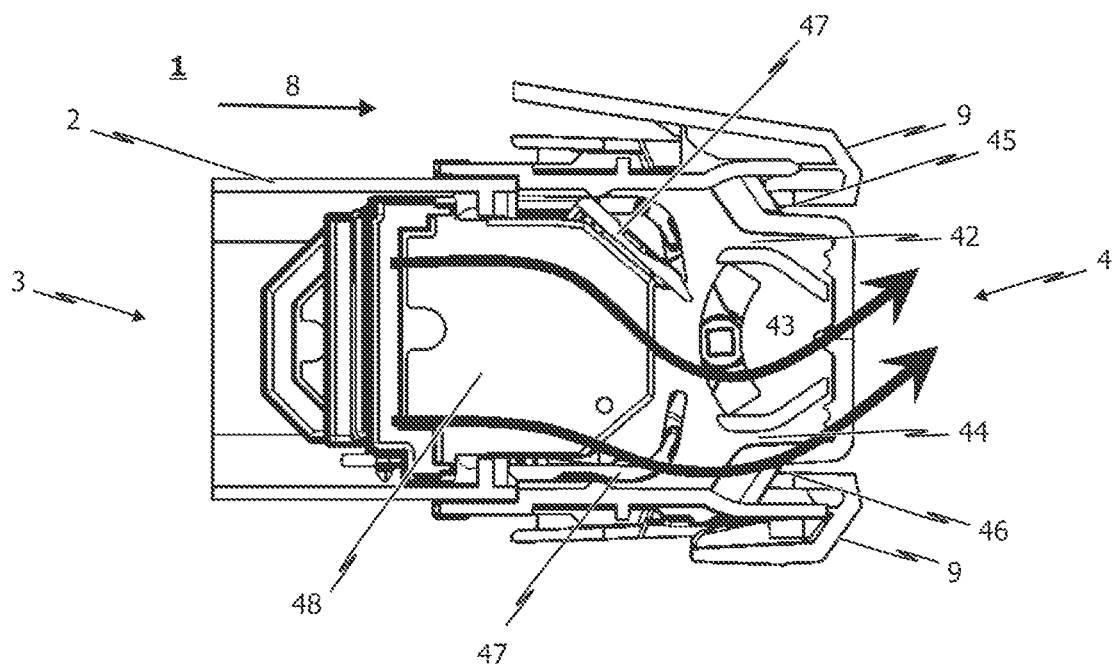
FIG. 14 schematically and in a cut view, the exemplary embodiment of the air vent according to the invention according to FIG. 12 and FIG. 13.
Figure 15:
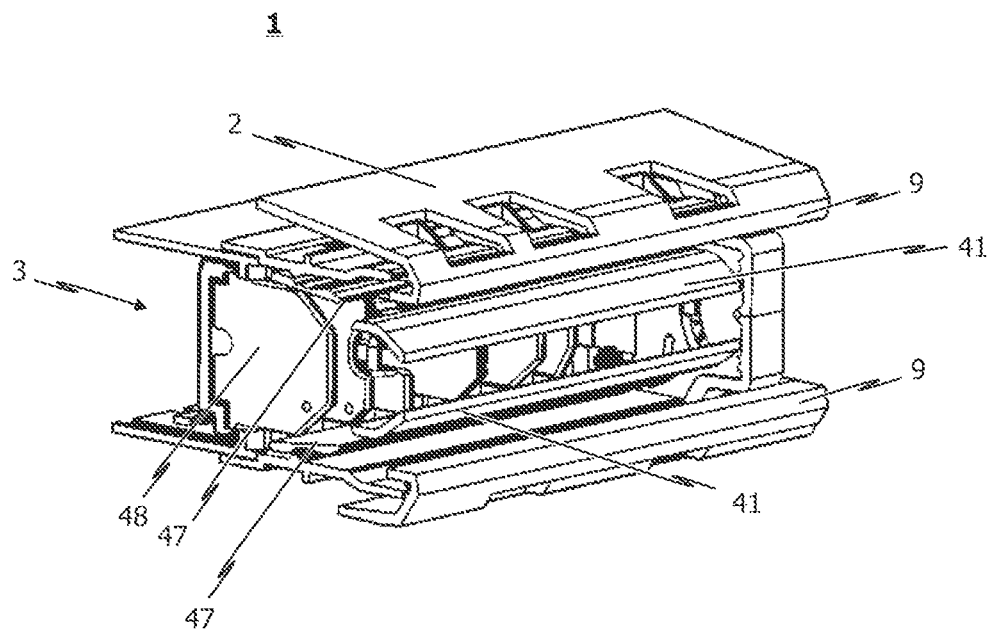
FIG. 15 schematically and in an isometric cut view, the exemplary embodiment of the air vent according to the invention according to FIG. 10.
Figure 16:
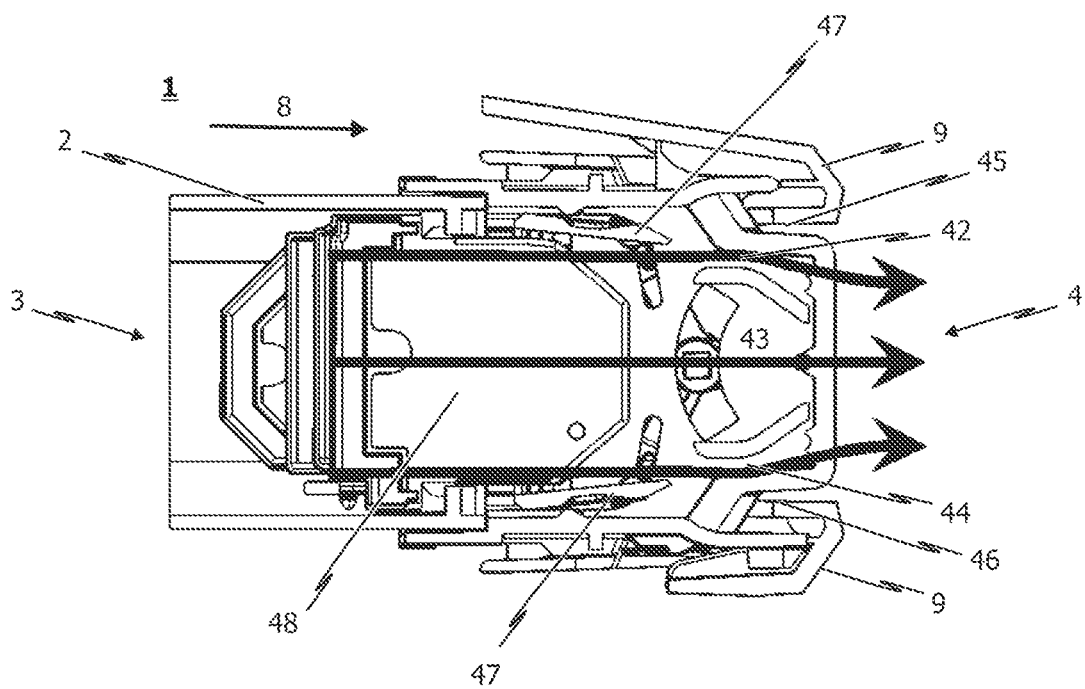
FIG. 16 schematically and in a cut view, the exemplary embodiment of the air vent according to the invention according to FIG. 10 and FIG. 15.

As can be discerned from the isometric views in, for example, FIG. 6, FIG. 7, and FIG. 8, for the purpose of air deflection as needed in the second, in particular horizontal, direction, the air vent 1 according to the exemplary embodiment shown therein comprises a plurality of second air guiding blades 35, which are for example motion-coupled to one another via a coupling rod mechanism. The second air guiding blades 35 are preferably arranged at least substantially parallel to one another in each position. The second air guiding blades 35 are in particular supported pivotally relative to the housing 2 and relative to the first air guiding blades 33 between a first end position and a second end position, wherein, in at least one of the two end positions, the second air guiding blades 35 preferably completely block the air guiding region 32 between the first air guiding blades 33.

The air vent 1 according to the second aspect of the invention is characterized in particular in that the first air guiding blades 33, which are in particular configured as grinding blades, form a nozzle in the upstream region of the housing 2 of the air vent 1 that deflects the airflow in a certain direction within the air vent 1. The thusly directed airflow is predetermined by the air guiding elements 31 into the final direction.

Referring now to the illustrations in FIG. 10 to FIG. 16, an exemplary embodiment of the air vent 1 according to the third aspect of the present invention will be described in further detail.

Like the embodiments according to the first and second aspects of the invention, the air vent 1 according to the third aspect of the invention comprises a housing 2 having an air inlet region 3 and an opposite air outlet region 4.

In a downstream region of the housing 2, when viewed in the main flow direction 8 of the air vent 1, in the embodiment of the air vent 1 according to the third aspect of the invention, two mutually at least regionally opposed air guiding shells 41 are provided such that between a first air guiding shell of the two air guiding shells 41 and an inner wall region of the housing 2 a first air guiding region 42 is formed, between the two air guiding shells 41 a second air guiding region 43 is formed, and between a second air shell of the two air guiding shells 41 and an inner wall region of the housing 2 a third air guiding region 44 is formed.

In particular, it is provided that the two air guiding shells 41 are configured as air guiding shells 41 that are fixed relative to the housing 2.

For the purpose of air deflection as needed in a first direction, in particular in a vertical direction, the air vent 1 comprises an air deflection device arranged upstream of the two air guiding shells 41, via which device the airflow coming from the air inlet region 3 of the housing 2 is optionally deflected through the first, second, and third air guiding region 42, 43, 44 or only through the first and second air guiding region 42, 43 or only through the second and third air guiding region 43, 44.

The device for air deflection is further configured in order to adjust a portion of the total airflow flowing through the housing 2, said portion flowing through the first and/or second and/or third air guiding region 42, 43, 44.

As can be discerned in particular from the cut views, the air guiding shells 41 each have a concave, curved surface facing in the direction of the second air guiding region 43.

Furthermore, in the exemplary embodiment of the air vent 1 according to the third aspect of the invention, it is conceivable that the air vent 1 comprises an aperture 9, which at least regionally or partially delimits the effective flow cross-section of the first and third air guiding region 42, 43. This aperture 9 can be designed, for example, in the form of a wall region of the housing 2 that projects regionally or partially into the first and third air guiding region 32.

With this measure, a first deflection/outflow edge 45 associated with the airflow portion flowing through the first air guiding region 42 and a second deflection/outflow edge 46 associated with the airflow portion flowing through the third air guiding region 44 are formed.

In particular, the device for air deflection comprises two first air guiding blades 47, which are at least regionally opposite to one another and pivotable relative to the housing 2 about an axis of rotation perpendicular to the first direction, said blades preferably being configured as grinding blades.

The two first air guiding blades 47 are motion-coupled such that, in a neutral position of the air vent 1, the airflow coming from the air inlet region 3 of the housing 2 is not or at least substantially not deflected by the two first air guiding blades 47, and that, for the purpose of air deflection in the first direction, the first air guiding blade of the two first air guiding blades 47, which lies further in the first direction, is retracted further into the air guiding region between the two first air guiding blades 47, and the other air guiding blade of the two first air guiding blades 47 is extended further out of the air guiding region between the two first air guiding blades 47 such that the portion of the total airflow flowing through the housing 2, said portion flowing through the air guiding region 47 lying further in the first direction, is reduced.

For the purpose of air deflection as needed in a second, in particular horizontal, direction perpendicular to the first direction, the air vent 1 comprises at least one second air guiding blade 48, which is pivotable about a second axis of rotation that extends perpendicular to the first axis of rotation. The at least one second air guiding blade 48 is preferably received at least regionally in the air guiding region between the two first air guiding blades 47.

In particular, in the exemplary embodiment of the air vent 1 according to the third aspect of the invention shown in the drawings, it is provided that, for the purpose of air deflection as needed in the second direction, the air vent 1 comprises a plurality of second air guiding blades 48, which are in particular motion-coupled to one another via a coupling rod mechanism, wherein the second air guiding blades 48 are preferably arranged at least substantially parallel to one another in each position, and wherein the second air guiding blades 48 are in particular supported pivotably relative to the housing 2 and relative to the two first air guiding blades 47 between a first end position and a second end position, wherein, in at least one of the two end positions, the second air guiding blades 48 block the air guiding region between the first air guiding blades 47, preferably completely.

The exemplary embodiment of the air vent 1 according to the third aspect of the invention is characterized in particular in that the first air guiding blades 47, preferably configured as grinding blades, form a nozzle in the upstream region of the housing 2 that deflects the airflow in a particular direction within the air vent 1.

For an upward airflow deflection, the first air guiding blades 47, in particular configured as grinding blades, deflect the airflow substantially against the lower fixed air guiding shell 41. The lower air guiding shell 41 thus experiences airflow around both sides.

The shape of the lower fixed air guiding shell 41 is suitable for deflecting the airflow and thus directing it upward.

In addition to the fixed air guiding shell 41, the airflow is also deflected on the edge 46 of the aperture 9 and thus directed upwards.

The fixed air guiding shells 41 experience airflow towards them and around them, depending on the position of the first air guiding blades 47.

Depending on the position of the first air guiding blades 47, the airflow is directed against the fixed air guiding shells 41 at differing strengths. If, rather, the airflow is deflected between the fixed air guiding shells 41, the proportion of the airflow directed straight increases, and a deflection thus becomes flatter.

The invention is not limited to the embodiments shown in the drawings, but results when all of the features disclosed herein are considered together.

LIST OF REFERENCE NUMERALS

1 Air vent
2 Housing
3 Air inlet region
4 Air outlet region
5 Airflow splitter (first embodiment)
6 First air guiding region (first embodiment)
7 Second air guiding region (first embodiment)
8 Main flow direction of the air vent
9 Aperture
10 First outflow edge (first embodiment)
11 Second outflow edge (first embodiment)
12 First air flap (first embodiment)
13 Second air flap (first embodiment)
14 First bulge (first embodiment)
15 Second bulge (first embodiment)
16 Air guiding blade for horizontal air deflection (first embodiment)
31 Air guiding element (second embodiment)
32 Air guiding region (second embodiment)
33 First air guiding blade (second embodiment)
34 Hollow, cylindrical baffle body (second embodiment)
35 Air guiding blade for in particular horizontal air deflection (second embodiment)
41 Air guiding shell (third embodiment)
42 First air guiding region (third embodiment)
43 Second air guiding region (third embodiment)
44 Third air guiding region (third embodiment)
45 First deflection/outflow edge (third embodiment)
46 Second deflection/outflow edge (third embodiment)
47 First air guiding blade (third embodiment)
48 Second air guiding blade (third embodiment)

The invention claimed is:

1. An air vent for a motor vehicle, wherein the air vent comprises a housing having an air inlet region and an opposite air outlet region,
wherein in the housing of the air vent, an airflow splitter, which extends at least regionally or partially transversely to a housing longitudinal direction, is arranged such that a first air guiding region and a second air guiding region are formed, wherein, for the purpose of air deflection as needed in a first direction, the air vent further comprises a device for airflow control, via which device a portion of the total airflow flowing through the housing is adjustable, said portion flowing through the first and/or second air guiding region;
wherein the device for airflow control comprises elements that are retractable as needed into the first and/or second air guiding region, wherein, for airflow control, the elements are configured as air flaps that are movable relative to the housing and the airflow splitter;
wherein, in a downstream region of the housing, when viewed in a main flow direction of the air vent, two air guiding shells, which are at least regionally opposite to one another, are provided such that between a first air guiding shell of the two air guiding shells and an inner wall region of the housing a first downstream air guiding region is formed, between the two air guiding shells a second downstream air guiding region is formed, and between a second air guiding shell of the two air guiding shells and an inner wall region of the housing a third downstream air guiding region is formed, wherein the two air guiding shells are configured as air guiding shells fixed relative to the housing, and wherein, for the purpose of air deflection as needed in the first direction, the device is configured to deflect the airflow coming from the air inlet region of the housing is optionally through the first, second, and/or third downstream air guiding region or only through the first and second downstream air guiding region or only through the second and third downstream air guiding region.

2. The air vent according to claim 1,
wherein the airflow splitter comprises an impact body that is fixed relative to the housing, which, when viewed in the main flow direction of the air vent, is arranged upstream of the air outlet region, wherein the air outlet region comprises an aperture delimiting the cross-section of an air outlet opening of the air vent at least regionally or partially, which aperture forms in the air outlet region a first outflow edge associated with the airflow portion flowing through the first air guiding region and a second outflow edge associated with the airflow portion flowing through the second air guiding region.

3. The air vent according to claim 2,
wherein the impact body of the airflow splitter and/or the aperture, which delimits the cross-section of the air outlet opening of the air vent at least regionally or partially, is/are configured such that, in a plan view of the air outlet opening of the air vent, only one end face of the impact body facing in a direction of the air outlet opening is visible.

4. The air vent according to claim 2,
wherein the aperture, which delimits the cross-section of the air outlet opening of the air vent at least regionally or partially, is configured such that, in a plan view of the air outlet opening of the air vent, it covers the first and second air guiding region.

5. The air vent according to claim 1,
wherein the device for airflow control comprises a first air flap associated with the first air guiding region and a second air flap associated with the second air guiding region, wherein the first air flap is supported pivotably relative to the housing and the airflow splitter about a first axis of rotation running perpendicular to the first direction and the second air flap is supported pivotably relative to the housing and the airflow splitter about a second axis of rotation running perpendicular to the first direction.

6. The air vent according to claim 5,
wherein the first and second air flap are each pivotally connected to the housing of the air vent via the upstream end region of the respective air flap, in such a way that the axes of rotation about which the first and second air flap are supported pivotably relative to the housing and the airflow splitter run through the upstream end region of the respective air flap.

7. The air vent according to claim 6,
wherein the housing comprises a first bulge associated with the first air flap, wherein the first air flap is at least regionally received or receivable in the first bulge when the first air flap is in its neutral position and is not pivoted relative to the housing and the airflow splitter; and/or
wherein the housing comprises a second bulge associated with the second air flap, wherein the second air flap is at least regionally received or receivable in the second bulge when the second air flap is in its neutral position and is not pivoted relative to the housing and the airflow splitter.

8. The air vent according to claim 5,
wherein, when viewed in the main flow direction of the air vent, an upstream end region of the first and second air flap lies respectively upstream of an upstream end region of the airflow splitter, and a downstream end region of the first and second air flap lies respectively downstream of a downstream end region of the airflow splitter.

9. The air vent according to claim 5,
wherein the first and second air flap are configured identically but in mirror-symmetry to one another, wherein the first and second air flap each have a straight surface facing in a direction of the respective air guiding region or a concave or convex curved surface facing in the direction of the respective air guiding region.

10. The air vent according to claim 5,
wherein the first and second air flap are motion-coupled to one another in such a way that, for the purpose of air deflection as needed in the first direction, one of the two air flaps is pivoted at least regionally into the correspondingly assigned air guiding region while the other of the two air flaps remains in its neutral position.

11. The air vent according to claim 5,
wherein the first and second air flap are motion-coupled to one another in such a way that, for airflow control, both air flaps are pivotable into the correspondingly associated air guiding region.

12. The air vent according to claim 5,
wherein, for the purpose of air deflection as needed in a second direction perpendicular to the first direction, the air vent comprises at least one air guiding blade, which is pivotable about a further axis of rotation running perpendicular to the first axis of rotation.

13. The air vent according to claim 1,
wherein the device for air deflection is further configured in order to adjust a portion of the total airflow flowing through the housing, said portion flowing through the first and/or second and/or third downstream air guiding region;
wherein:
the air guiding shells each have a concave curved surface facing in the direction of the second air guiding region; and/or
a respective surface of the air guiding shells facing in the direction of the second air guiding region is adjustable; and/or
the air guiding shells are each configured as cylindrical shell-shaped curved air guiding elements.

14. The air vent according to claim 1,
wherein the air vent comprises an aperture at least regionally or partially delimiting the effective flow cross-section of the first and third downstream air guiding region, in the form of a wall region of the housing projecting regionally or partially into the first and third downstream air guiding region, which aperture forms a first deflection/outflow edge associated with the airflow portion flowing through the first downstream air guiding region and a second deflection/outflow edge associated with the airflow portion flowing through the third downstream air guiding region.

15. An air vent for a motor vehicle, wherein the air vent comprises a housing having an air inlet region and an opposite air outlet region,
wherein in the housing of the air vent, an airflow splitter, which extends at least regionally or partially transversely to a housing longitudinal direction, is arranged such that a first air guiding region and a second air guiding region are formed, wherein, for the purpose of air deflection as needed in a first direction, the air vent further comprises a device for airflow control, via which device a portion of the total airflow flowing through the housing is adjustable, said portion flowing through the first and/or second air guiding region;
wherein the device for airflow control comprises a first air flap associated with the first air guiding region and a second air flap associated with the second air guiding region, wherein the first air flap is supported pivotably relative to the housing and the airflow splitter about a first axis of rotation running perpendicular to the first direction and the second air flap is supported pivotably relative to the housing and the airflow splitter about a second axis of rotation running perpendicular to the first direction;
wherein, when viewed in a main flow direction of the air vent, an upstream end region of the first and second air flap lies respectively upstream of an upstream end region of the airflow splitter, and a downstream end region of the first and second air flap lies respectively downstream of a downstream end region of the airflow splitter.

16. An air vent for a motor vehicle, wherein the air vent comprises a housing having an air inlet region and an opposite air outlet region,
wherein in the housing of the air vent, an airflow splitter, which extends at least regionally or partially transversely to a housing longitudinal direction, is arranged such that a first air guiding region and a second air guiding region are formed, wherein, for the purpose of air deflection as needed in a first direction, the air vent further comprises a device for airflow control, via which device a portion of the total airflow flowing through the housing is adjustable, said portion flowing through the first and/or second air guiding region;

wherein for the purpose of air deflection as needed in the first direction, the air vent comprises two air guiding elements, which are at least regionally mutually opposed to one another and are pivotable relative to the housing about a common axis of rotation perpendicular to the first direction, between which elements an air guiding region is formed, wherein the two air guiding elements are uniformly pivotable, wherein, when viewed in a main flow direction of the air vent, two first air guiding blades are provided upstream of the two air guiding elements, being at least regionally mutually opposed to one another and pivotable relative to the housing about an axis of rotation perpendicular to the first direction, which are configured in order to direct the airflow coming from the air inlet region of the housing in the direction of an entry region of the air guiding region formed between the two air guiding elements.

17. The air vent according to claim 16, wherein the air guiding elements are formed by wall regions of a hollow, cylindrical baffle body that is pivotable relative to the housing about an axis of rotation perpendicular to the first direction;

wherein the hollow, cylindrical baffle body comprises an at least substantially rectangular cross-sectional surface;

wherein the hollow, cylindrical baffle body has a length that is approximately equal to the distance between the air guiding elements or is greater than the distance between the air guiding elements.

18. The air vent according to claim 16, wherein the first air guiding blades are configured as grinding blades associated with the air guiding elements, wherein the two first air guiding blades form a confusor region in which the airflow coming from the air inlet region of the housing is accelerated in the direction of the entry region of the air guiding region formed between the two air guiding elements;

wherein the two first air guiding blades are motion-coupled to the air guiding elements in such a way that, upon a pivoting of the air guiding elements about the common axis of rotation, the first air guiding blades are pivoted in an opposite direction;

wherein the two first air guiding blades are pivotable relative to the housing about a common axis of rotation perpendicular to the first direction.

19. The air vent according to claim 16, wherein, for the purpose of air deflection as needed in a second direction perpendicular to the first direction, the air vent comprises at least one second air guiding blade, which is pivotable about a second axis of rotation running perpendicular to the first axis of rotation, wherein the at least one second air guiding blade is preferably received at least regionally between the two first air guiding blades;

wherein the at least one second air guiding blade is received at least regionally between the two first air guiding blades in such a way that, upon a pivoting of the two first air guiding blades relative to the housing, the at least one second air guiding blade is likewise pivoted.

20. The air vent according to claim 19, wherein, for the purpose of air deflection as needed in the second direction, the air vent comprises a plurality of second air guiding blades, which are motion-coupled to one another via a coupling rod mechanism, wherein the second air guiding blades are arranged at least substantially parallel to one another in each position, and wherein the second air guiding blades are supported pivotably relative to the housing and relative to the first air guiding blades between a first end position and a second end position, wherein, in at least one of the two end positions, the second air guiding blades block the air guiding region between the first air guiding blades.

21. The air vent according to claim 16, wherein, for the purpose of air deflection as needed in a second direction perpendicular to the first direction, the air vent comprises at least one second air guiding blade, which is pivotable about a second axis of rotation running perpendicular to the first axis of rotation, wherein the at least one second air guiding blade is preferably received at least regionally in the air guiding region between the two first air guiding blades;

wherein, for the purpose of air deflection as needed in the second direction, the air vent comprises a plurality of second air guiding blades, which are motion-coupled to one another via a coupling rod mechanism, wherein the second air guiding blades are arranged at least substantially parallel to one another in each position, and wherein the second air guiding blades are supported pivotably relative to the housing and relative to the two first air guiding blades between a first end position and a second end position, wherein, in at least one of the two end positions, the second air guiding blades block the air guiding region between the first air guiding blades.

* * * * *